I. FINE,

Assignor to E. M. FINE.

Suspension Ring and Hook.

No. 9,494. Reissued Dec. 7, 1880.

Witnesses:

A. P. Grant,

W. F. Kircher

Inventor:

Isaac Fine, by John A. Diedersheim

ATTORNEY.

N. PETERS, PHOTO-LITHOGRAPHER, WASHINGTON, D. C.

UNITED STATES PATENT OFFICE.

ISAAC FINE, OF PHILADELPHIA, PENNSYLVANIA, ASSIGNOR TO E. M. FINE, OF SAME PLACE.

SUSPENSION RING AND HOOK.

SPECIFICATION forming part of Reissued Letters Patent No. 9,494, dated December 7, 1880.

Original No. 215,340, dated May 13, 1879. Application for reissue filed July 21, 1880.

*To all whom it may concern:*

Be it known that I, ISAAC FINE, a citizen of the United States, residing in the city and county of Philadelphia, and State of Pennsylvania, have invented a new and useful Improvement in Suspension Rings and Hooks, which improvement is fully set forth in the following specification and accompanying drawings, in which—

Figure 1:
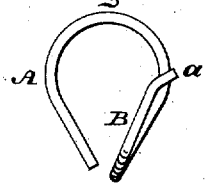
Figure 2:
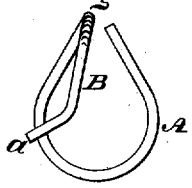
Figure 3:
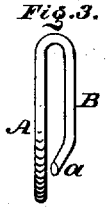
Figure 4:
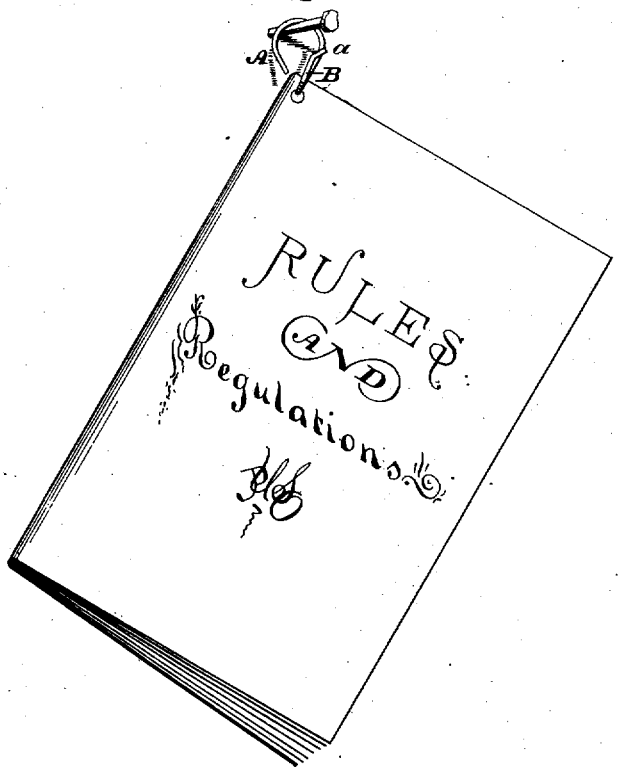
Figure 5:
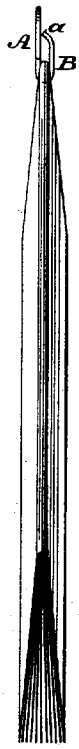
Figure 6:
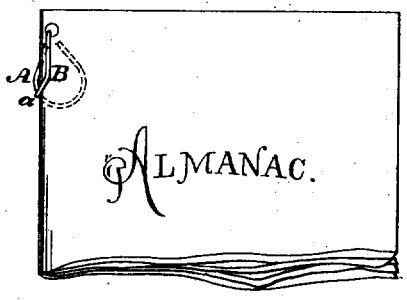

Figures 1 and 2 are face views of the hook embodying my invention. Fig. 3 is a side view thereof. Figs. 4, 5, and 6 are views illustrating the application and operation of the hook.

Similar letters of reference indicate corresponding parts in the several figures.

My invention relates to a device for suspending or hanging pamphlets, cards, &c.; and it consists of a metallic ring adapted to be hung on a nail, pin, or similar article, and a loop continuous of the ring for the suspension of the pamphlet, &c., the construction being such that the ring portion is unobstructed for the reception of the nail, &c. The device may be folded within or nearly within the confines of the pamphlet, &c., to which it is attached, and the loop portion is locked both in folded and unfolded positions of the device for preventing disengagement of the pamphlet, &c., and in the folded position of the device, limiting the folding of the device on said pamphlet, &c.

Referring to the drawings, A represents a ring formed of a piece of wire, from the bottom of which is turned up or rises a loop, B, inclined laterally or in the direction of one portion or length of the ring, with an intervening space. The end of the loop is bent inwardly, as at *a*, so as to approach the ring and partly close the adjacent intervening space.

The operation is as follows: The loop B is inserted in an opening in the corner, or elsewhere, of the pamphlet, card, &c., so that the pamphlet, &c., hangs on the bottom bend of the loop. The ring A stands uppermost, and is unobstructed, whereby it may be fitted on a nail, pin, or otherwise secured, and thus suspend the pamphlet, &c., as in Fig. 4.

When the pamphlet, &c., is taken down the hook remains connected thereto, as the end *a* of the loop forms in a measure a lock for said loop, whereby the pamphlet, &c., is prevented from slipping off the loop. The ring A, though swung around, may again be suspended by simply hooking it over the head of the nail, the ring quickly righting itself.

When pamphlets, &c., are to be laid in numbers or bundles for transportation or packing, or it is desirable to fold the hooks thereon, the ring of each pamphlet, &c., is swung from the position shown in Figs. 1, 4, and 5, so as to come in contact with the pamphlet, &c., as shown in Figs. 2, 3, and 6, in which position the ring rests flat against one side of the pamphlet, &c., and the loop is on the opposite side thereof, the end *a* approximating the back of the pamphlet, &c., and limiting the folding of the device on the pamphlet, &c. The weight of the superimposed pamphlets, &c., when in piles or bundles, causes the loops to yield, which is permitted by the uncontrolled ends *a*, whereby there will be no material increase in the thickness of the bundle of pamphlets, &c. Moreover, as the loop B is inclined laterally or extends in the direction of one portion or length of the ring and parallel or almost parallel therewith, the ring and loop fold within or nearly within the confines of the pamphlet, &c., whereby the latter may be nicely packed without material projection of the suspension-hooks.

Having thus described my invention, what I claim as new, and desire to secure by Letters Patent, is—

1. The suspension-hook formed of a ring having a loop which is turned up from the bottom thereof, and having its upper end bent inwardly, substantially as and for the purpose set forth.

2. The ring A, having a loop, B, which is turned up from the bottom, inclined laterally parallel with one side of the ring, and with its upper end bent inwardly, substantially as and for the purpose set forth.

ISAAC FINE.

Witnesses:

JOHN A. WIEDERSHEIM,

F. COOPER.